United States Patent [19]
Lewis

[11] Patent Number: 5,469,630
[45] Date of Patent: Nov. 28, 1995

[54] GIMBALLED COMPASS DEVICE

[76] Inventor: W. Stan Lewis, 709 Mar Vista Dr., Vista, Calif. 92083

[21] Appl. No.: 297,847

[22] Filed: Aug. 30, 1994

[51] Int. Cl.[6] ............... G01C 17/26; G01C 17/18
[52] U.S. Cl. ............ 33/355 R; 33/360; 33/346; 33/364; 33/363 K; 33/354; 33/391
[58] Field of Search ................ 33/355 R, 360, 33/344, 345, 346, 349, 364, 363 R, 363 K, 340, 341, 351, 352, 353, 354, 391, 397, DIG. 3

[56] References Cited

U.S. PATENT DOCUMENTS

| | | | |
|---|---|---|---|
| 2,873,536 | 2/1959 | Rieger | 33/354 |
| 3,084,443 | 4/1963 | Kaatz et al. | 33/352 |
| 4,047,168 | 9/1977 | Fowler | 33/363 R |
| 4,117,602 | 10/1978 | Lapeyre | 33/363 K |
| 4,341,023 | 7/1982 | Marcus et al. | 33/363 K |
| 4,414,754 | 11/1983 | Lapeyre | 33/363 K |
| 4,577,414 | 3/1986 | Migliori et al. | 33/363 K |
| 4,720,631 | 1/1988 | Lapeyre | 250/231 SE |
| 5,079,845 | 1/1992 | Childers | 33/355 R |

OTHER PUBLICATIONS

"A Dictionary of Symbols", 2nd ed. J. E. Cirlot, (no month) 1971 2nd ed. ISBN 0-88029-702-6, pp. 48, 49, 98, 99, 246 and 247.
"The Book of the Dragon", Griffins et al. (No Month) 1979 ISBN 0-89009-241-9 p. 10.

Primary Examiner—Christopher W. Fulton
Attorney, Agent, or Firm—Thomas Hamill, Jr.

[57] ABSTRACT

A gimballed compass apparatus is disclosed which provides directional and inclinational data. The apparatus comprises a rotatably mounted slotted disk wherein the slot is continuously varying in width around the circumference of the disk. The disk incorporates an elongated magnet which causes it to rotate in relation to an external magnetic field. A first and second aperture are located on the top and bottom elements of the chamber defining a emission passage. The apertures have a rectangular length approximately the maximum width of the slot. The slotted disk is positioned intermediate the apertures. An emission housing is provided below the chamber and includes an emission source and a first source detector. A second source detector is provided above the chamber. The source detectors provide a response to the intensity of emission incident upon them. The position of the disk is thus determinable from the intensity of the source received by the first source detector in relation to the second source detector since the detector's response function is known a priori. The assembly is gimbal mounted. A second slot with continuously variable width is provided in the emission housing. The inclination of the gimbal relative to the horizon is determined by a third source detector mounted on the an outer housing. The primary use of the invention is as a gimbal mounted compass including a digital display output of direction and inclination. Applications include navigation, aerospace, robotics and defense.

17 Claims, 5 Drawing Sheets

GIMBALLED COMPASS DEVICE

BACKGROUND OF THE INVENTION

1. Field of the Invention

The present invention relates generally to compasses, and more particularly, to a gimbal mounted compass which utilizes light attenuation slots to develop directional and inclinational data.

2. Description of the Prior Art

Compasses which utilize a rotating disk with a light attenuation means located thereon have been disclosed in the form of an optical shaft encoder and are well known in the art. Compass devices which employ gimballing are equally well known.

A typical example of a device which incorporates gimbal structure is U.S. Pat. No. 4,047,168 issued to Fowler. This device utilizes a disk which is photoelectrically sensed to provide output signals representative of a compass heading. It is supported by a gimbal assembly which includes pivots which serve as electrical terminals.

A typical example of a device which incorporates encoder structure is U.S. Pat. No. 4,117,602 issued to Lapeyre. This device incorporates a light emitting diode to illuminate a series of tracks on a coded disk. The tracks located on the coded disk are a plurality of alternating light transmissive and light opaque regions which represent one bit of a multiple bit digital code. A sensor array senses the light transmitted through the disk as the disk is rotated by a magnet means and through appropriate signal processing is able to decode the signals into directional information.

Other means to derive information from a light source and a compass card is shown in U.S. Pat. No. 4,577,414 to Migliori et al. This device includes a compass disk which is rotatable and has a magnet means and a light polarizing means located thereon. A light beam is split into a plurality of beams two of which pass through a first polarizing means and two of which pass through a second polarizing means, the second polarizing means having their optical axes at right angles to the first polarizing means. By comparison of the ratio of the intensities of the beams which pass through the polarizing means one may determine the angle of the magnet means in relation to a fixed axis of the compass body.

U.S. Pat. No. 4,720,631 issued to Lapeyre discloses a compass card which has a linear array in a spatial relation with a light source. Intermediate the array and the light source is a rotating disk with slots located thereon. As the disk rotates the light is passed through the slots in such a manner that the linear array may detect a certain or specific random pattern of illumination which corresponds to a specific disk position. The signals generated by the array are decoded on the basis of a unique positional calibration stored in a read-only-memory and then output to the user.

Thus, while the foregoing body of prior art indicates it to be well known to use encoder shafts and other means to determine position by utilizing digitizing means and polarization means, the provision of a more simple and cost effective electronic compass device which may be mass produced and utilized by the common man is not contemplated. Nor does the prior art described above teach or suggest a simple compass device which utilizes a compass card having a light transmission slot which varies in width whereby the light transmission slot attenuates the light intensity mechanically in such a manner where the instantaneous light intensity transmitted therethrough itself gives positional information.

The foregoing disadvantages are overcome by the unique compass card of the present invention as will be made apparent from the following description thereof. Simplicity is evident over the prior art in that the response function is a linear function of the source emission intensity striking one or more detectors as described herein. The linearity is determined by the linearly variable width of the slot on the compass card and the source detector means employed, the source detector being selected to have a linear response to the incident intensity. Further, neither expensive polarizing sheets or fiber optic cables are needed nor are extensive read-only-memory to store positional correlation information. Other advantages of the present invention over the prior art also will be rendered evident.

SUMMARY OF THE INVENTION

To achieve the foregoing and other advantages, the present invention, briefly described, provides a low cost, simple apparatus to yield positional information relative to a horizon and an external magnetic field. The apparatus includes a slotted disk wherein the slot is continuously varying in width around the circumference of the disk. The disk incorporates a magnet which causes it to rotate in relation to an external magnetic field. The slotted disk is mounted inside a chamber by a central element which permits the disk to rotate freely. A cylindrical chamber surrounds the slotted disk, the cylindrical chamber has a top element, a bottom element and a side element. The cylindrical chamber is fluid filled. The fluid acts as a damping means. A first and second aperture are located on the top and bottom of the cylindrical chamber defining an emission passage. The apertures are rectangular and have a length approximately the width of the slot. The area of the apertures approximates the area of the sensitive portion of the detectors. The slotted disk is positioned intermediate the apertures with the slot located in the emission passage.

An emission housing is located below the cylindrical chamber. The emission housing includes an emission source which is selected to be isotropic, and a first source detector. The first source detector is proximal the emission source.

A second source detector is located atop the chamber. The second source detector generates a signal proportional to the intensity of the emission which passes through the chamber. The emission that passes through the chamber is attenuated first by the bottom aperture and then by the position of the slotted disk.

The emission housing is a generally half-spherical wall. The wall includes an elongated triangular slot, defining a second emission passage.

The cylindrical chamber and emission housing form a central element with the center of mass near the bottom. The central element is gimbal mounted. The gimbal depends from a main housing. The main housing has a third source detector mounted thereon in such a manner to detect emissions from the second emission passage.

The first, second and third source detectors provide a response to the intensity of emission incident upon them. As the slotted disk rotates the continuously variable width of the slot located on the disk linearly attenuates the source intensity relative to the second source detector. As the gimbal mounted central element tilts, the continuously variable width of the slot located on the wall linearly attenuates the source intensity relative to the third source detector. The position of the disk, as well as the central element's inclination is thus determinable from the electrical signals generated by the first, second and third source detectors. The electrical signals may be conditioned and processed in a microprocessor to generate an LCD output.

The inclination of the gimbal relative to the horizon is determined by a third source detector mounted on the main housing. As the central element tilts in the gimbal mount, reflecting a change in inclination, the emission intensity detected by the third source detector will vary relative to that inclination. The primary use of the invention is as a gimbal mounted compass which would include a digital output of direction and inclination.

The ouroboros is an archaic term applied to a tail biting dragon or serpent used to symbolize circumference or eternity. In the context of this disclosure it is used as a noun to describe a right triangle where the hypotenuse and side opposite are pulled at the apex of the angle which joins them in a circle. The apex so rotated then contacts the side opposite that apex at the base of the right angle. The term ouroboros is used to describe the continuously varying width slot of the slotted disk of the instant invention and will be referred to as such below.

General Theory of Operation

The gimballed compass disclosed herein comprises a rotatably mounted slotted disk on which is mounted an elongated magnet. The slotted area of the disk forms a passage, this passage is proximal to the circumference of the disk. The slotted disk is affixed in a cylindrical chamber. An emission source resides below the cylindrical chamber in an emission housing, the emission source has a first emission source detector located in proximal relation. Emanations from the emission source pass through the cylindrical chamber which surrounds the slotted disk, as well as strike the first emission source detector. The emanations pass through a first and second aperture located on the top of the chamber and the bottom of the chamber, respectively. The top aperture and bottom aperture are rectangular and define an emission passage. The rectangular apertures are covered by a membrane transparent to the source emission spectrum. Source emanations pass through the variable width slot in the rotatably mounted disk and strike the second emission source detector. The second source detector means is selected such that the response function of the detector is preferably linear, or otherwise well known, with respect to incident intensity upon it from the emission source. The slot width changes continuously and linearly as the disk rotates such that the first emanation intensity striking the source detector is attenuated as the disk rotates. This attenuation of the source emission emanations first intensity causes the source emanation to be detected as a second intensity, the second intensity described being less than the first, the first intensity being detected by the first source detector. Variations in the second intensities relative to the first intensity are thus an indication of the orientation of the disk.

The emission housing is located below the cylindrical housing. The emission housing includes the emission source and the first source detector. The emission housing is a generally half-spherical wall. The wall includes a triangular slot which defines a second emission passage. The cylindrical chamber and the emission housing form a central element. The central element is gimbal mounted. The gimbal depends from the main housing. The main housing has a third source detector and an aperture mounted thereon in such a manner to detect emissions from the second emission passage. The inclination of the gimbal relative to the horizon is determined by the third source detector mounted on the main housing. As the central element tilts in the gimbal mount, reflecting a change in inclination, the emission intensity detected by the third source detector will vary relative to that inclination.

A rectangular aperture is fixed proximal the third source detector, the rectangular aperture's length being the maximum width of the triangular slot. The emission from the second emission passage passes through the rectangular aperture and yields a third intensity. The intensity of the third intensity on a source detector means fixed to the main housing, relative to the first intensity, generated by the first source detector, provides the angle of inclination of the main housing. The apertures width is selected in such a fashion where the area of the aperture approximates the area of the sensitive portion of the detector.

If desired, an additional outer housing may be affixed to an additional gimbal mount, the additional gimbal mount being perpendicular to the first gimbal mount, with another detector located on the additional outer housing. A second triangular slot would be provided on the half-spherical wall, defining a third emission passage. Through a similar mechanism as discussed above, additional information concerning inclination may be developed for a second, perpendicular plane.

The discussion of the preferred embodiment will fully illuminate the operation of the disclosed device.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least one preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved directional orientation device which has all of the advantages of the prior art and none of the disadvantages.

This invention provides for directional information, as a compass, with respect to orientation in an external magnetic field. It is an object of the present invention to provide a light weight, low cost electronic orientation device with digital output sensitive to an external magnetic field having simple circuitry and logic.

It is an object of this invention to provide a low cost compass which provides for a signal which varies linearly with a direction indicated. This is accomplished by providing a slot of continuous, linear, varying width on the compass card and by employing source detector means which provide a signal which is a linear function of the emission intensity received by the source detector means.

It is an object of this invention to provide a low cost compass which is gimbal mounted; said gimbal mount having affixed a source detection means which yield a linear response from an emission source such that the angle of the compass position relative to the horizon is a linear function of the intensity striking said source detector and can be measured and output.

It is a further object of this invention to provide a very low cost directional orientation device for use where generally low orientation resolution is adequate. The orientation resolution is a function of both the rate of change of width of the slot and the aperture width which attenuates the source emission in relation to the response sensitivity of the source detector means employed.

It is another object of this invention to provide a very low cost gimbal mount which will provide an indication of the degree of tilt relative to the horizon of a gimballed apparatus, such as a compass.

It is another object of the present invention to provide a new an improved directional orientation device which may be easily and efficiently manufactured and marketed.

It is a further objective of the present invention to provide a new and improved directional orientation device which is of durable and reliable construction.

An even further object of the present invention is to provide a new and improved directional orientation device which is susceptible of a low cost of manufacture with regard to both materials and labor, and which accordingly is then susceptible of low prices of sale to the consuming public, thereby making such a directional orientation device readily available to the buying public.

Additional objects, advantages and novel features of the invention will be set forth in part in the description that follows, and in part will become apparent to those skilled in the art upon examining the following or may be learned by practice of the invention. These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

To meet the aforementioned objectives the following preferred embodiment is disclosed.

Figure 1:
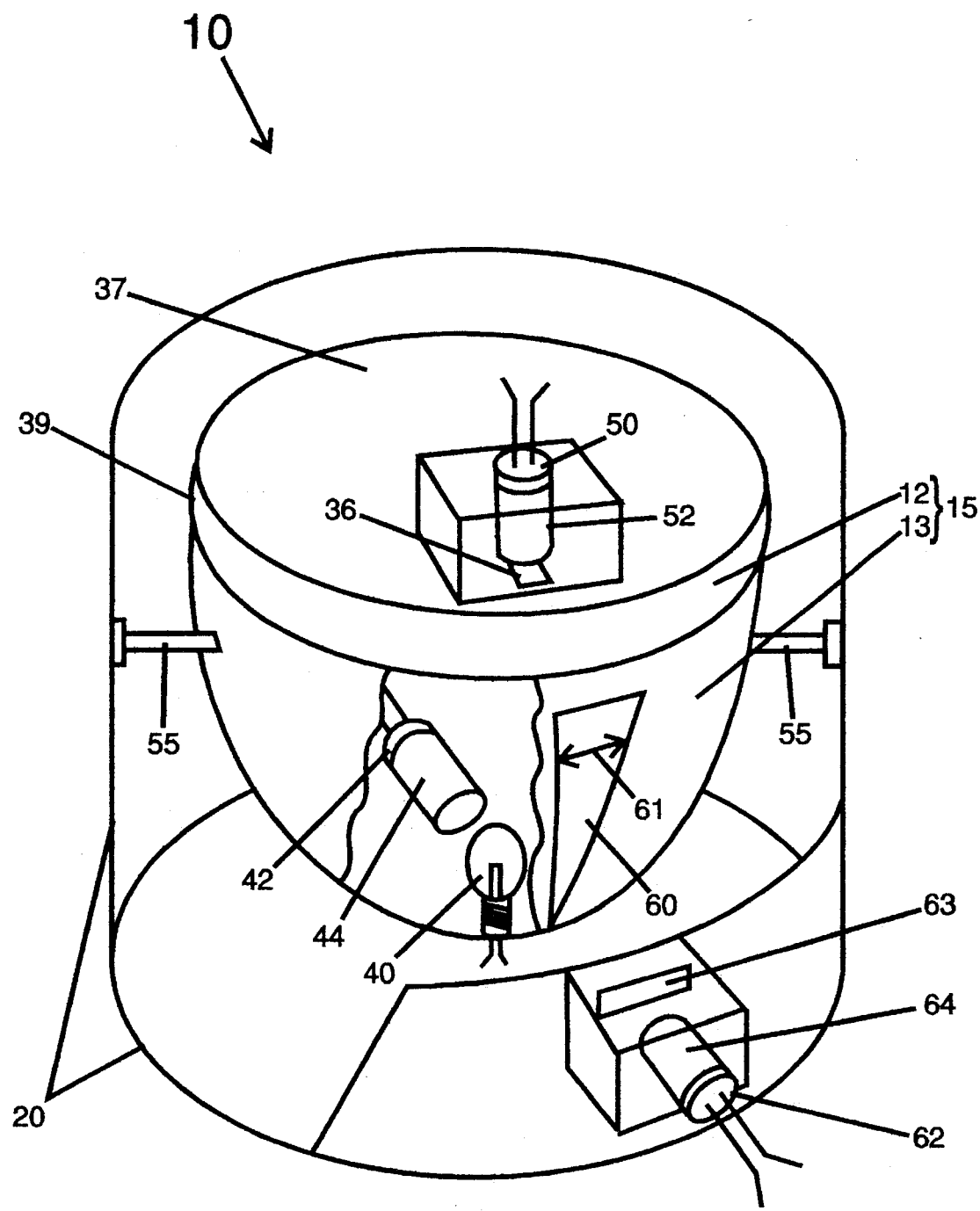
FIG. 1 is a cut away view showing the orientation of the gimbal mounted central element located within the main housing.

Referring now specifically to FIG. 1, a gimballed compass device 10 which generates inclinational data is shown. The compass device 10 includes a chamber 12 which is located above an emission housing 13. Central element 15 is the combination of chamber 12 sitting atop emission housing 13. The emission housing 13 surrounds an emission source 40 and a first source detector 42. The emission source 40 may be a radiation source, an ultraviolet source, an infrared or near infrared source, a light emitting diode, a visible light source, or any other appropriate source. The first source detector 42 provides a reference signal indicating the unattenuated emission source intensity. The first source detector 42 may be a radiation detector, an ultraviolet detector, an infrared or near infrared detector, a visible light detector, or any other appropriate detector device, such as a charged coupled device. The combination of the emission housing 13 and the chamber 12 is known as the central element 15. Central element 15 is surrounded by a main housing 20. Central element 15 is suspended within the main housing 20 by a gimbal mounting 55. Central element 15 may freely tilt by means of the gimbal mount 55.

Chamber 12 houses a slotted disk 14. The slotted disk 14 will be discussed in detail in reference to FIG. 2. Chamber 12 includes a top element 37 and a side element 39. Located on the top element 37 of the chamber 12 is a second source detector 50. The second source detector 50 may be a radiation detector, an ultraviolet detector, an infrared or near infrared detector, a visible light detector, or any other appropriate detector device, such as a charged coupled device. Second source detector 50 includes a second collimation means 52. The emission from the emission source 40 will be detected by the second source detector 50. This emission will be attenuated and will permit the second source detector to generate a signal proportional to the slotted disk 14 position. The specific details of the attenuation of the emission and the path that the emission travels through the chamber 12 will be explained in detail in the discussion of FIG. 2.

A triangular slot 60 is located on the emission housing 13. This triangular slot 60 has a maximum width and a minimum width. The triangular slot's width 61 is variable between the maximum width and the minimum width, no two width values are identical. This triangular slot 60 will attenuate the emission generated by the emission source 40. A third source detector 62 is mounted on the main housing 20. The third source detector 62 may be a radiation detector, an ultraviolet detector, an infrared or near infrared detector, a visible light detector, or any other appropriate detector device, such as a charged coupled device. A third rectangular aperture 63 is located on the main housing 20 intermediate the third source detector 62. The third rectangular aperture 63 maximum dimension is equal to that of the triangular slot 60 maximum width. A third collimator 64 collimates the emission which has been attenuated first by the triangular slot 60 and second by the third rectangular aperture 63. The third collimator 64 also insures that stray light sources other than those emitted by the emission source do not interfere with the central element 15 position determination. As the central element 15 rotates on the gimbals 55, the emission projected by the triangular slot 60 will vary as sensed by the third emission detector 62. This variance of emission intensity is directly related to the central element 15 rotation. This central element 15 rotation is an indicator of the inclination the compass device 10 is being instantly subjected to.

The first source detector 42, the second source detector 50 and the third source detector 62 are all chosen in such a fashion as to be able to detect the emission from the emission source 40.

Figure 2:
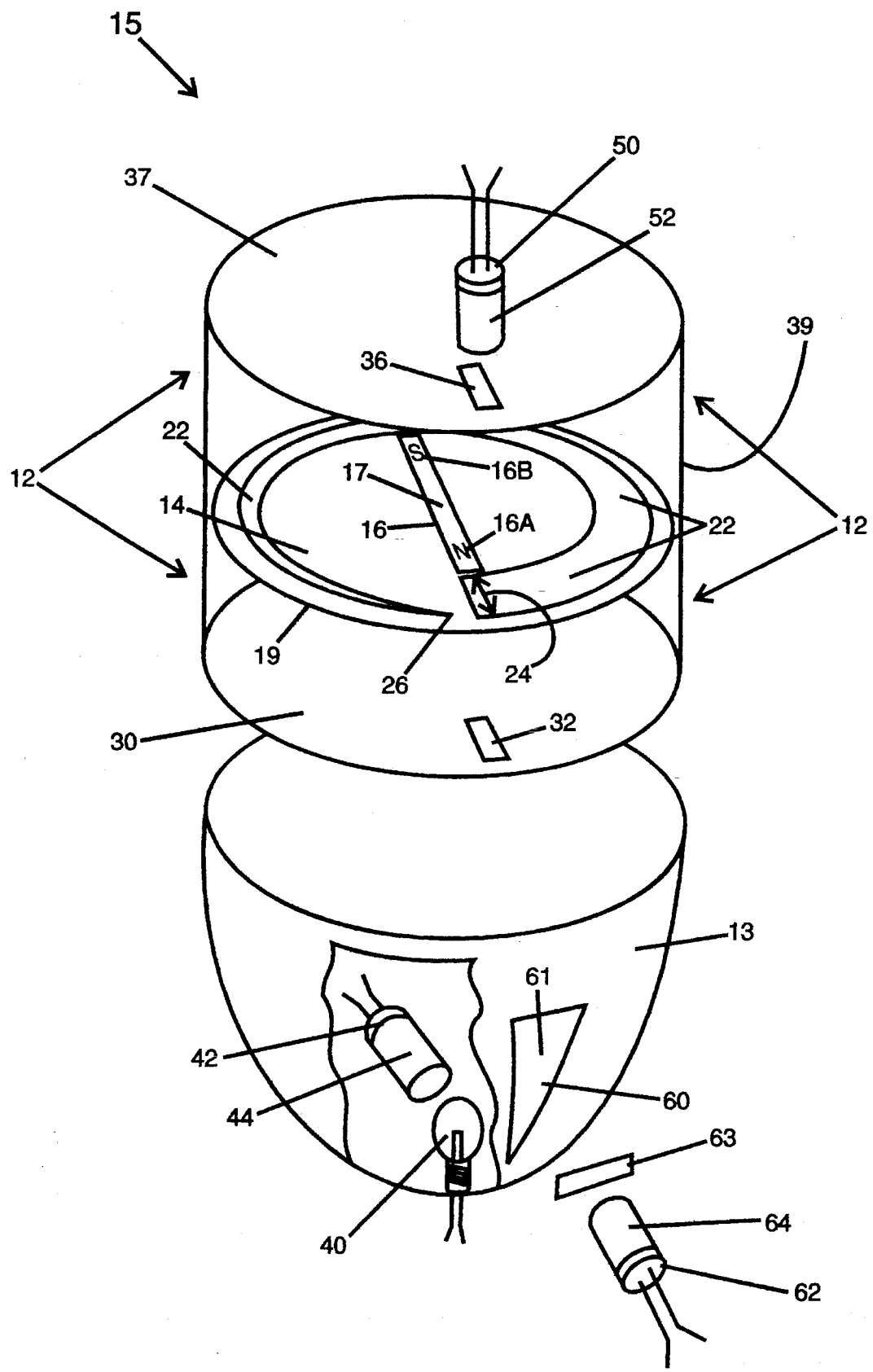
FIG. 2 presents an exploded view showing the central element components in relation to the slotted disk.

Referring now specifically to FIG. 2, an exploded view of the central element 15 is provided including the first source detector 42, the second source detector 50 and the third source detector 62.

Figure 3:
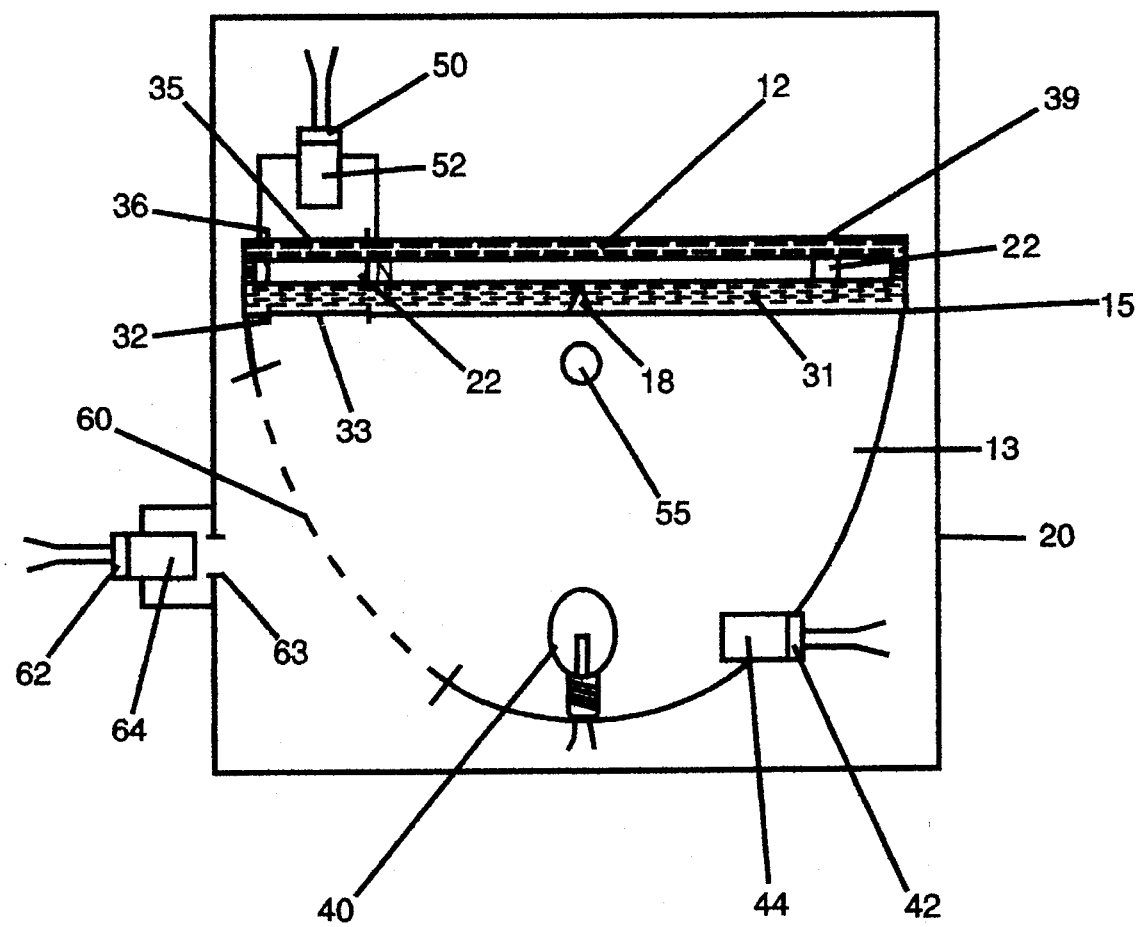
FIG. 3 presents a cross sectional view of the preferred embodiment including the main housing.

A slotted disk 14 or compass card is provided. The slotted disk 14 has an elongated permanent magnet 16 mounted thereon. The slotted disk 14 includes a mounting means 18, as best seen in FIG. 3, which would suspend the slotted disk 14 in such a fashion to permit it to freely rotate. The slotted disk has a center 17 and a circumference 19. A slot 22 is provided generally about the circumference 19 which defines a passage through the slotted disk 14. The slot 22 has a maximum width 24 and a minimum width 26. The slot 22 varies in width as the slot 22 circumscribes the circumference 19 of the slotted disk 14. No two slot 22 widths are the same and the width becomes smaller from the maximum width 24 to the minimum width 26. The slot 22 approximates the shape of an ouroboros or an elongated triangular element which has been scribed about the circumference of the slotted disk 14.

The permanent magnet 16 has a north direction 16A and a south position 16B. The magnet 16 is orientated in such a fashion where the north direction 16A is facing the point of maximum width 24 on the slot 22 in a radial fashion.

The slotted disk 14 and bottom element 30 lay intermediate the emission source 40 and the second detector 50. The second detector 50 is fixed above aperture 36, aperture 36 in turn is located above slot 22. The second collimator 52 is proximal the second detector 50. The second collimator 52 collimates the attenuated emission from the emission source 40 and channels the collimated, attenuated portion of the emission into the second detector 50. The second collimator 52 insures that stray emanations other than those from the emission source do not interfere with the disk location determination. The emission is first rectangularly attenuated by the aperture 32 located on the bottom element 30. The emission is further attenuated by the slot 22 of the slotted disk 14.

As the slotted disk 14 rotates due to the interaction of the elongated permanent magnet 16 with an external magnetic field, the slot 22 moves in relation to the second detector 50. As the slot 22 width varies with the slot 22 position about the circumference, different amounts of the emission are attenuated as a function of slotted disk 14 position. The second detector 50 produces a signal which relates to the attenuated emission intensity.

Referring now specifically to FIG. 3 a cross sectional view of the gimballed compass and inclination device is shown.

The slotted disk 14 is centrally supported inside the chamber 12. The mounting means 18 permits free rotation of the slotted disk 14. The chamber 12 has a bottom element 30 which is fixed below the slotted disk 14. The bottom element 30 is equivalent geometrically to the slotted disk 14, and shares an equivalent radius, circumference, diameter etc. The first aperture 32 is located on the bottom element 30. The first aperture 32 is rectangular and is orientated radially on the bottom element 30, the aperture's minimum rectangular dimension being approximately parallel to the circumference of the bottom element 30. The first aperture 32 length is equivalent to the maximum width 24 of the slot 22.

The chamber 12 is filled with a fluid 31. The fluid 31 is surrounded by a bottom element 30, a top element 37 and a side element 39 which form the chamber 12. The fluid 31 damps the rotation of the slotted disk 14. The fluid 31 is also transparent to the emission, i.e. the fluid 31 permits the transmission of the emission without significantly degrading the emission's intensity. A first transparent membrane 33 covers the first rectangular aperture 32.

A second transparent membrane 35 covers a second aperture 36 located on the top element 37 of the chamber 12. The second aperture 36 is also approximately rectangular, and has an appropriate orientation, preferably radially with its lesser dimension parallel to the circumference of the chamber 12. The greater dimension would be that of the maximum width 24 of the slot 22.

An emission source 40 is located below the bottom element 30. A first detector 42 is proximal the emission source 40. A first collimator 44 is proximal the first detector 42. The first collimator 44 collimates the emission from the emission source 40 and channels the collimated portion of the emission to the first detector 42. The first detector 42 produces a signal which relates to the unattenuated emission intensity. The first detector 42 will generate an unattenuated signal which will be used as a reference value for emission intensity prior to attenuation. The function of the first detector 42 is to provide this reference intensity signal for comparison to the attenuated signal. Such an unattenuated signal is provided to correct for changes in emission intensity with time due to battery drain, ambient temperature, or other physical conditions which may alter the inherent emission intensity or detection thereof.

The slotted disk 14 and bottom element 30 lay intermediate the emission source 40 and a second detector 50. The second detector 50 is fixed above aperture 36, aperture 36 in turn is located above slot 22. A second collimator 52 is proximal the second detector 50. The second collimator 52 collimates the attenuated emission from the emission source 40 and channels the collimated, attenuated portion of the emission into the second detector 50. The second collimator 52 insures that stray emanations other than those from the emission source do not interfere with the disk location determination. The emission is first rectangularly attenuated by the aperture 32 located on the bottom element 30. The emission is further attenuated by the slot 22 of the slotted disk 14.

As the slotted disk 14 rotates due to the interaction of the elongated permanent magnet 16 with an external magnetic field, the slot 22 moves in relation to the second detector 50.

As the slot 22 width varies with the slot 22 position about the circumference, different amounts of the emission are attenuated as a function of slotted disk 14 position. The second detector 50 produces a signal which relates to the attenuated emission intensity.

A triangular slot 60 is located on the emission housing 13. This triangular slot 60 has a maximum width and a minimum width as is best shown in FIG. 2. The triangular slot's width 61 is variable between the maximum width and the minimum width, no two width values are identical. This triangular slot 60 will attenuate the emission generated by the emission source 40. A third source detector 62 is mounted on the main housing 20. A third rectangular aperture 63 is located on the main housing 20 intermediate the third source detector 62. The third rectangular aperture 63 maximum dimension is equal to that of the triangular slot 60 maximum width. A third collimator 64 collimates the emission which has been attenuated first by the triangular slot 60 and second by the third rectangular aperture 63. The third collimator 64 insures that stray light sources other than those emitted by the emission source do not interfere with the central element 15 position determination. As the central element 15 rotates on the gimbals 55, the emission projected by the triangular slot 60 will vary as sensed by the third emission detector 62. This variance of emission intensity is directly related to the central element 15 rotation. This central element 15 rotation is an indicator of the inclination the compass device 10 is being instantly subjected to.

The comparison of the reference value with the attenuated values gives directional information and will be discussed below in greater detail.

It is to be understood that means to power an appropriate emission source 40, such as batteries for a light source, have been considered desirable. Also, a light bulb which may be detected by a cadmium sulfide photoconductive detector may be employed, both of these elements are susceptible to extremely low cost and are currently commercially available. In this case, the first detector means 42, the second detector means 50 and the third detector means 62 will be chosen to be cadmium sulfide photoconductive detectors.

It has been contemplated that a solar panel may be employed to charge the batteries in the instant invention. Such a mechanism would be expeditious as in the intended use of the device a solar flux or other light flux would be readily available to the user.

Figure 4:
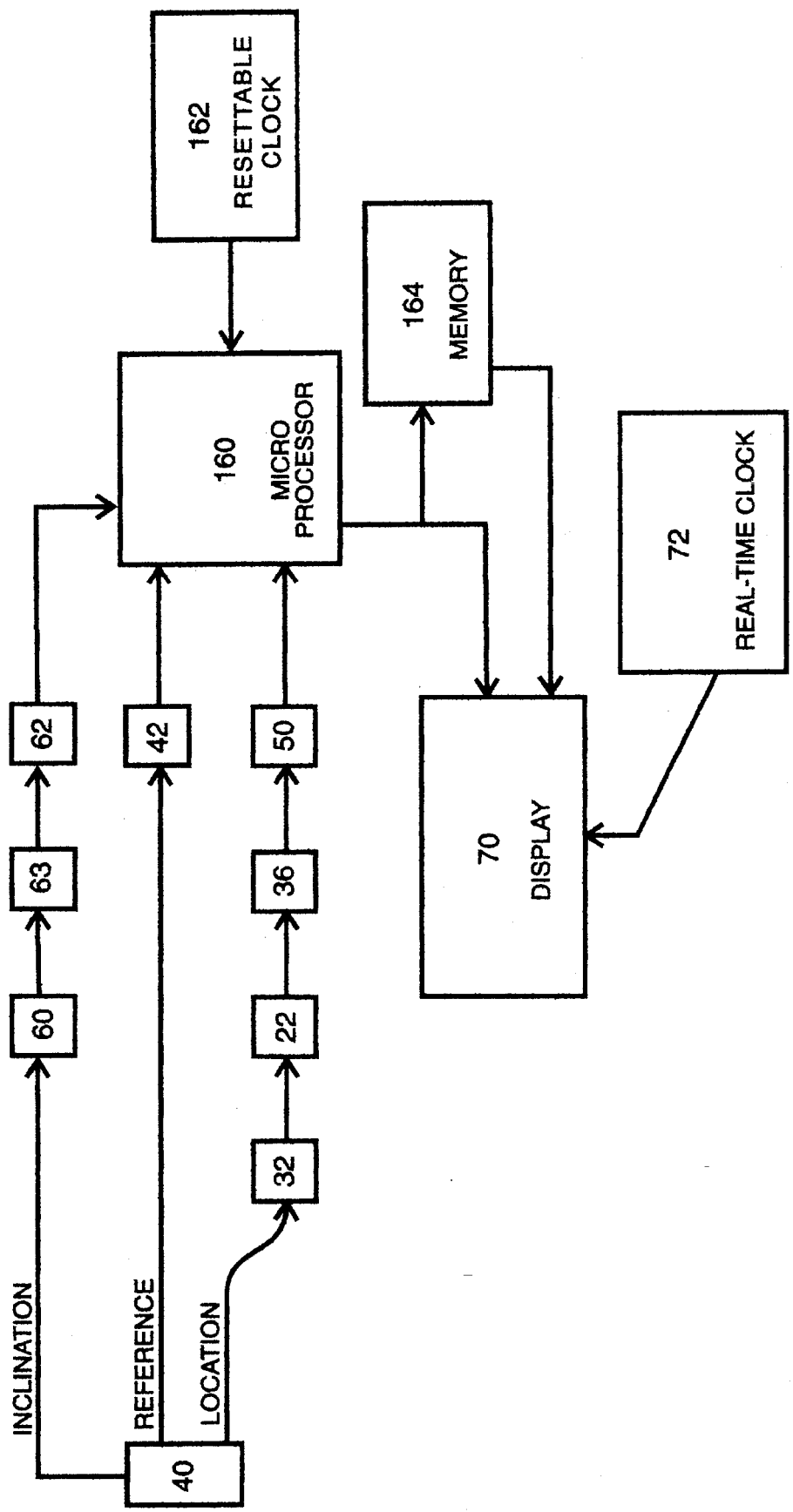
FIG. 4 presents a block diagram which discloses the different components of the compass device.

Referring now specifically to FIG. 4, a block diagram is presented which relates various components of the compass device. A microprocessor 160 processes the attenuated signal generated by the second detector 50, and the non-attenuated or reference signal generated by the first detector 42. A resettable clock 162 provides a time signal of certain duration. The microprocessor 160 will evaluate the signals and store conditioned information into a memory storage device 164. The conditioned signals conform to instant directional information, and the stored conditioned signals conform to previous directional information. Through simple processing the precise bearing and inclination may be determined.

A display face 70 will display current direction, and may present data to allow the user to return to the point of origin. A real-time clock device 72 also may have its output displayed on the display face 70.

Calibration is accomplished by obtaining the maximum location signal from the second source detector 50 in a predefined direction. By design, the maximum signal from the second source detector 50 is obtained by orienting the compass apparatus 10 to Magnetic North at a desired inclination, such as one which approaches or is identical to the horizontal. The microprocessor 160 receives both the reference signal from the first source detector 42 and the location signal from the second source detector 50. A ratio of the two signals is then calculated:

$$R_N = I_{max}/I_r$$

where $R_N$ is the calculated ratio for the intensity of magnetic North. $I_r$ is the intensity of the reference signal generated by the first source detector 42 and $I_{max}$ is the maximum obtainable location detector signal from second source detector 50, at Magnetic North. Magnetic North, by convention, is taken to be both 0 and 360 degrees with the angle increasing in value moving clockwise around a circle from 0 degrees at Magnetic North to 360 degrees, again, at Magnetic North. An unknown direction corresponds to a known measured intensity $I_u$, and a new reference intensity $I'_r$ measured simultaneously. The determination is made by pointing the compass in the forward direction indicated on the housing. The new reference signal for that observation determines the corrected $I_{max}$:

$$I'_{max} = I'_r \times R_N$$

The position is then determined from 0 to 359 degrees. Hence, minus 360 divided by the corrected maximum intensity times the unknown intensity:

$$P_x = 360 - (360/I'_{max}) \times I_u$$

where $P_x$ is the location in degrees relative to the clockwise direction, with magnetic North as both 0 and 360 degrees. It is evident that when $I_u=0$, then $P_x=360$ degrees, and when $I_u=I'_{max}$, then $P_x=0$ degrees.

It is recognized that random sampling errors occur in obtaining the intensity values. For both calibration and unknown direction determination the microprocessor 160 will automatically take at least three samples, a few seconds apart, while the user is pointing the compass housing in the direction indicated on the housing. These samples will be averaged by the microprocessor 160 to provide a single reading and a standard deviation. These will be stored in memory 164 and displayed on display face 70. The standard deviation will be used to provide the user with an error estimate of the heading indication, such as the 95% confidence limit for the unknown direction. The determination of sampling error is well known and is not further discussed here. In addition to the unknown direction the direction 180 degrees opposite of that determined will also be displayed for user convenience. The electronics and microprocessor technology required to accomplish these calculations are well known. Also, illustrated in FIG. 4 is a real-time clock 72 which will display correct time. A resettable clock 162 is accessed when readings are taken and results are stored in memory 164, the results being a time interval which aids in navigational calculations. Calibration and other conditioning of signals related to the inclination are well known and accomplished in the same general fashion as discussed above.

Figure 5:
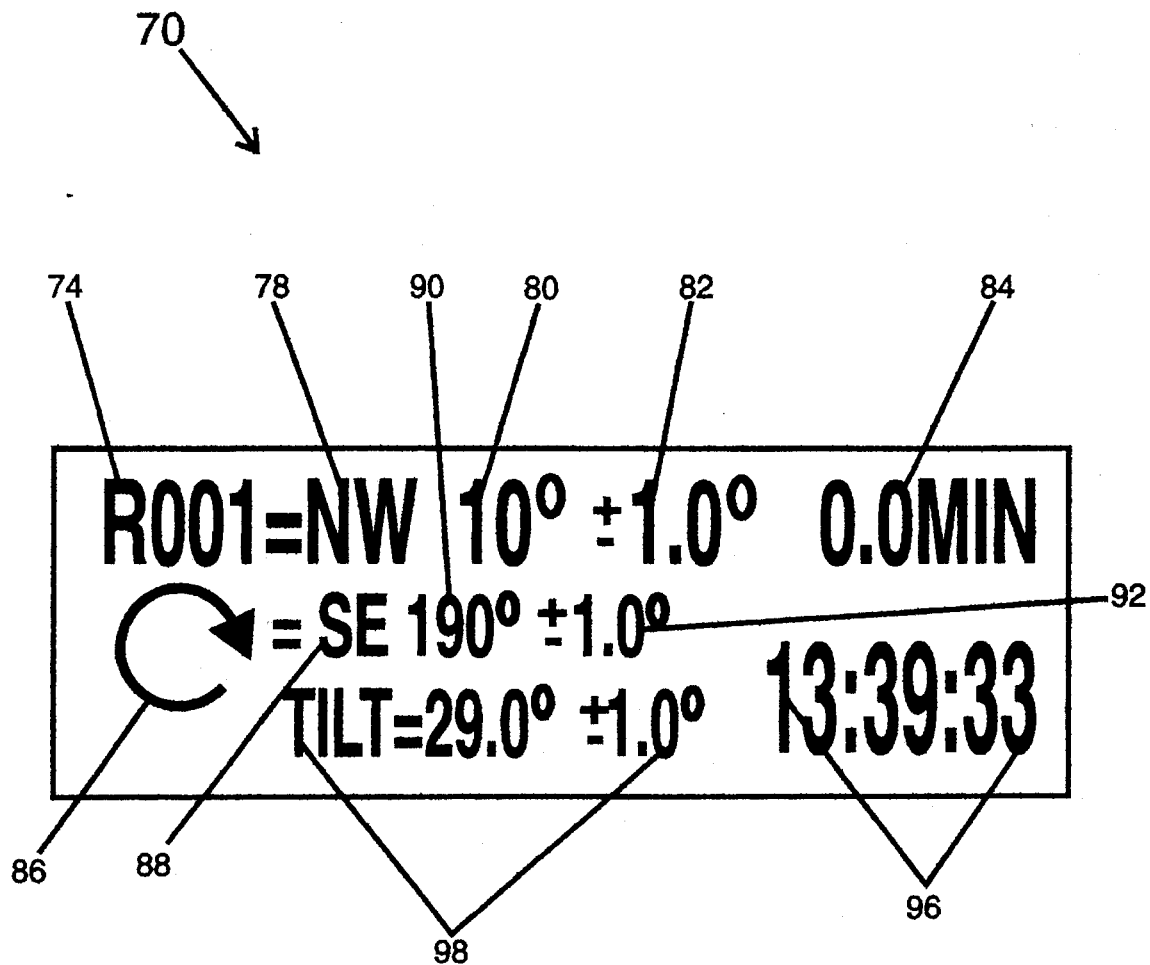
FIG. 5 illustrates an embodiment of the digital display which is to be output to the user of the device.

FIG. 5 illustrates the information which will be displayed. A display face 70 is provided with multiple readouts. Readout 74 displays which sample is currently being utilized. Readout 78 displays a compass heading utilizing cardinal points of the compass. Readout 80 displays a compass heading in degrees. Readout 82 displays an estimated error of the heading in degrees. Readout 84 displays the time interval in minutes that the compass bearing has been travelled on.

Further readouts would be employed when retracing the path travelled. Readout 86 displays rear and indicates the rear readouts associated with readout 86 on the display face 70. Readout 88 displays the back compass heading utilizing cardinal points which would be utilized when retracing the route travelled. Readout 90 displays a back compass heading in degrees. Readout 92 displays an estimated error of the back heading in degrees. Display 96 is the current real-time display. Display 98 indicates the inclination or tilt angle of the device as well as an estimated error of the inclination.

All of the displayed data may utilize LED or LCD readouts and may employ other readout devices. It is understood that FIG. 5 gives just one example of a possible configuration for the display face 70. Many other possible configurations for the display face 70 are possible and another may be preferred.

With the information stored and available for recall the user can sketch on paper or on a map the path traveled by employing standard dead reckoning methods. Using well known navigation methods paths so determined can be retraced within the precision of the apparatus disclosed herein. The intrinsic uncertainty and accuracy of the compass and factors which effect it's readings are well known hence not further detailed here.

It is apparent from the above that the present invention accomplishes all of the objectives set forth by providing a new and improved, low cost, orientation device with a digital output, which is sensitive to an external magnetic field, the device having simple circuitry and logic.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

I claim:

1. A device for determining a directional orientation with respect to an external magnetic field and attitude orientation with respect to a horizon, said device comprising:

a housing, said housing being generally cylindrical and having a wall, an emission housing, said emission housing being generally half spherical, said half spherical housing having a surface, a center and a radius, said emission housing nested inside said housing, said emission housing connected to said housing by a gimbal means wherein said emission housing is freely tiltable in a first direction with respect to said housing, said emission housing having an interior, an emitting means having an emission, said emission having a first intensity, said emitting means located in said interior, a first detection means, said first detection means located proximal to said emitting means, a second detection means, a chamber, said chamber located atop said emission housing, a freely rotatable disk, said disk mounted in said chamber by a mounting means, said disk intermediate said emitting means and said second detection means, said disk having a magnet mounted thereon, said disk having a position relative to the external magnetic field, said disk being generally circular, including a center and a circumference, said disk including a slot, said slot proximal to the circumference and defining a first passage through said disk, said first passage having a first width, said first width varying linearly about the circumference, said first passage permits a first portion of said emission to propagate therethrough, said first portion having a second intensity, said second intensity detected by said second detection means, a third detection means, said third detection means located on said wall, said emission housing including a second slot, said second slot on said surface and defining a second passage through said emission housing, said second slot having a second width, said second width varying linearly along said surface, said second passage permits a second portion of said emission to propagate therethrough, said second portion having a third intensity, said third intensity detected by said third detection means, whereby said first detection means generates a first signal proportional to said first intensity, said second detection means generates a second signal proportional to said second intensity, and said third detection means generates a third signal proportional to said third intensity, said second signal proportional to said disk position, said third signal proportional to said emission housing tilt.

2. The device as claimed in claim 1 wherein said emitting means is selected from the group consisting of a visible light source, a light emitting diode, an ultraviolet source, a radiation source and an infrared source.

3. The device as claimed in claim 1 wherein said first detector means, said second detector means, and said third detector means are selected from the group consisting of a charged coupled device, a visible light detector, a radiation detector, an ultraviolet detector and an infrared detector.

4. The device as claimed in claim 1 wherein said chamber includes a top element, a side element and a bottom element, said top element having a first aperture, said bottom element having a second aperture, said first aperture and said second aperture defining an emission passage, said emission passage being in communication with said emission.

5. The device as claimed in claim 4 wherein said chamber is generally cylindrical, said chamber being filled with a fluid, said fluid being transparent to said emission.

6. The device as claimed in claim 5 wherein said first aperture is covered by a first membrane, and said second aperture is covered by a second membrane, said first membrane and said second membrane being transparent to said emission.

7. The device as claimed in claim 1 including a clock, said clock generating a time signal; and further including, a microprocessor means, said microprocessor means for storing, comparing and conditioning said first signal, said second signal, said third signal and said time signal in such a manner to generate a course heading, an instant direction, and an error.

8. The device as claimed in claim 7 wherein said time signal, said course heading, said instant direction, and said error are displayed on a liquid crystal display.

9. The device as claimed in claim 1 wherein said first detector means, said second detector means and said third detector means are cadmium sulfide photoconductive devices.

10. A device for determining a directional orientation with respect to a magnetic field and attitude orientation with respect to a horizon comprising:

an emission means, a first detection means, said first detection means proximal said emission means, said first detection means detecting a first intensity, an emission first variable attenuation means, a second detection means, said emission first variable attenuation means intermediate said emission means and said second detection means, said second detection means detecting a second intensity, an emission second variable attenuation means, a third detection means, said emission second variable attenuation means intermediate said emission means and said third detection means, said third detection means detecting a third intensity, whereby said first detection means generates a first signal proportional to said first intensity, said second detection means generates a second signal proportional to said second intensity, and said third detection means generates a third signal proportional to said third intensity, said second signal proportional to the device's directional orientation, said third signal proportional the device's attitude orientation.

11. The device as claimed in claim 10 wherein said emission first variable attenuation means includes a generally circular disk with a slot, said slot located about a circumference of said circular disk, said slot having a width, said width having a maximum dimension and a minimum dimension, said width continuously decreasing in size from said maximum dimension to said minimum dimension.

12. The device as claimed in claim 11 wherein said disk has a magnet mounted thereon.

13. The device as claimed in claim 12 wherein said emission second variable attenuation means includes a housing, said housing having a wall, said wall including an elongated triangular aperture, said triangular aperture having a width, said width having a maximum dimension and a minimum dimension, said width continuously decreasing in size from said maximum dimension to said minimum dimension.

14. The device as claimed in claim 13 including a clock, said clock generating a time signal; and further including, a microprocessor means, said microprocessing means utilized for storing, comparing and conditioning said time signal, said first signal, said second signal and said third signal in such a manner to generate a course heading, an instant direction, and an error.

15. The device as claimed in claim 14 wherein said time signal, said course heading, said instant direction and said error are displayed on a liquid crystal display.

16. The device as claimed in claim 15 wherein said emitting means is selected from the group consisting of a visible light source, a light emitting diode, an ultraviolet source, a radiation source and an infrared source.

17. The device as claimed in claim 16 wherein said first detector means, said second detector means, and said third detector means are selected from the group consisting of a charged coupled device, a visible light detector, a radiation detector, an ultraviolet detector and an infrared detector.

* * * * *